US009247280B2

(12) United States Patent
Le Buhan

(10) Patent No.: US 9,247,280 B2
(45) Date of Patent: Jan. 26, 2016

(54) STORAGE AND USE METHOD OF A BROADCASTED AUDIO/VIDEO EVENT

(75) Inventor: Corinne Le Buhan, Les Paccots (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 2327 days.

(21) Appl. No.: 11/878,092

(22) Filed: Jul. 20, 2007

(65) Prior Publication Data
US 2008/0022299 A1 Jan. 24, 2008

(30) Foreign Application Priority Data

Jul. 24, 2006 (EP) .................................... 06117739

(51) Int. Cl.
H04N 7/16 (2011.01)
H04N 21/4147 (2011.01)
H04N 7/167 (2011.01)
H04N 21/266 (2011.01)
(Continued)

(52) U.S. Cl.
CPC ........... *H04N 21/4147* (2013.01); *H04N 7/163* (2013.01); *H04N 7/1675* (2013.01); *H04N 21/26606* (2013.01); *H04N 21/26613* (2013.01); *H04N 21/43615* (2013.01); *H04N 21/4405* (2013.01); *H04N 21/4408* (2013.01); *H04N 21/4623* (2013.01); *H04N 21/4627* (2013.01); *H04N 21/63345* (2013.01); *H04N 21/8355* (2013.01)

(58) Field of Classification Search
CPC .................. H04N 21/26606; H04N 21/26613; H04N 21/4147; H04N 21/43615
See application file for complete search history.

(56) References Cited

U.S. PATENT DOCUMENTS 4,890,321 A * 12/1989 Seth-Smith et al. .......... 380/231
5,036,537 A * 7/1991 Jeffers et al. .................. 380/241
(Continued)

FOREIGN PATENT DOCUMENTS

WO  WO 02/054765 A1  7/2002
WO  WO 2005/006706 A1  1/2005

OTHER PUBLICATIONS

DVB-Digital Video Broadcasting. "Digital Video Broadcasting (DVB); Content Protection & Copy Management". DVB Document vol. A094, pp. 1-103. Nov. 2005.
(Continued)

Primary Examiner — Nhon Diep
(74) Attorney, Agent, or Firm — Harness, Dickey & Pierce, P.L.C.

(57) ABSTRACT

The aim of the present invention is to allow the flexible exploitation of a broadcasted and recorded content, in particular to allow both users as well as broadcasters to conciliate temporary prohibition and posterior exploitation.
This aim is achieved by a storage method of a broadcasted event, by at least one receiver, this method comprising the following steps:
  storage of an event encrypted by at least one content key
  storage of a control license comprising the content key, an event identifier and the first usage conditions,
  after the diffusion of the event has finished, generation and storage of a release message, comprising the event identifier and the second usage conditions,
  during the exploitation of the event, search for a release message, and if such message exists, execution of the second usage conditions of the release message in place of the first usage conditions of the control license.

10 Claims, 1 Drawing Sheet

(51) Int. Cl.
*H04N 21/436* (2011.01)
*H04N 21/4405* (2011.01)
*H04N 21/4408* (2011.01)
*H04N 21/4623* (2011.01)
*H04N 21/4627* (2011.01)
*H04N 21/6334* (2011.01)
*H04N 21/8355* (2011.01)

(56) References Cited

U.S. PATENT DOCUMENTS

| | | | |
|---|---|---|---|
| 5,621,793 A * | 4/1997 | Bednarek et al. | 380/240 |
| 6,009,116 A * | 12/1999 | Bednarek et al. | 375/130 |
| 7,725,720 B2 * | 5/2010 | Moreillon | 713/171 |
| 2002/0023010 A1 * | 2/2002 | Rittmaster et al. | 705/26 |
| 2002/0154777 A1 * | 10/2002 | Candelore | 380/258 |
| 2003/0187801 A1 | 10/2003 | Chase et al. | |
| 2003/0200444 A1 | 10/2003 | Sasselli | |
| 2005/0183112 A1 | 8/2005 | Duval | |

OTHER PUBLICATIONS

C. Le Buhan. "CPCM Security threat analysis Rev 11". Digital video broadcasting (DVB) content protection and copy management (CPCM) System. pp. 1-41. Apr. 2006.

* cited by examiner

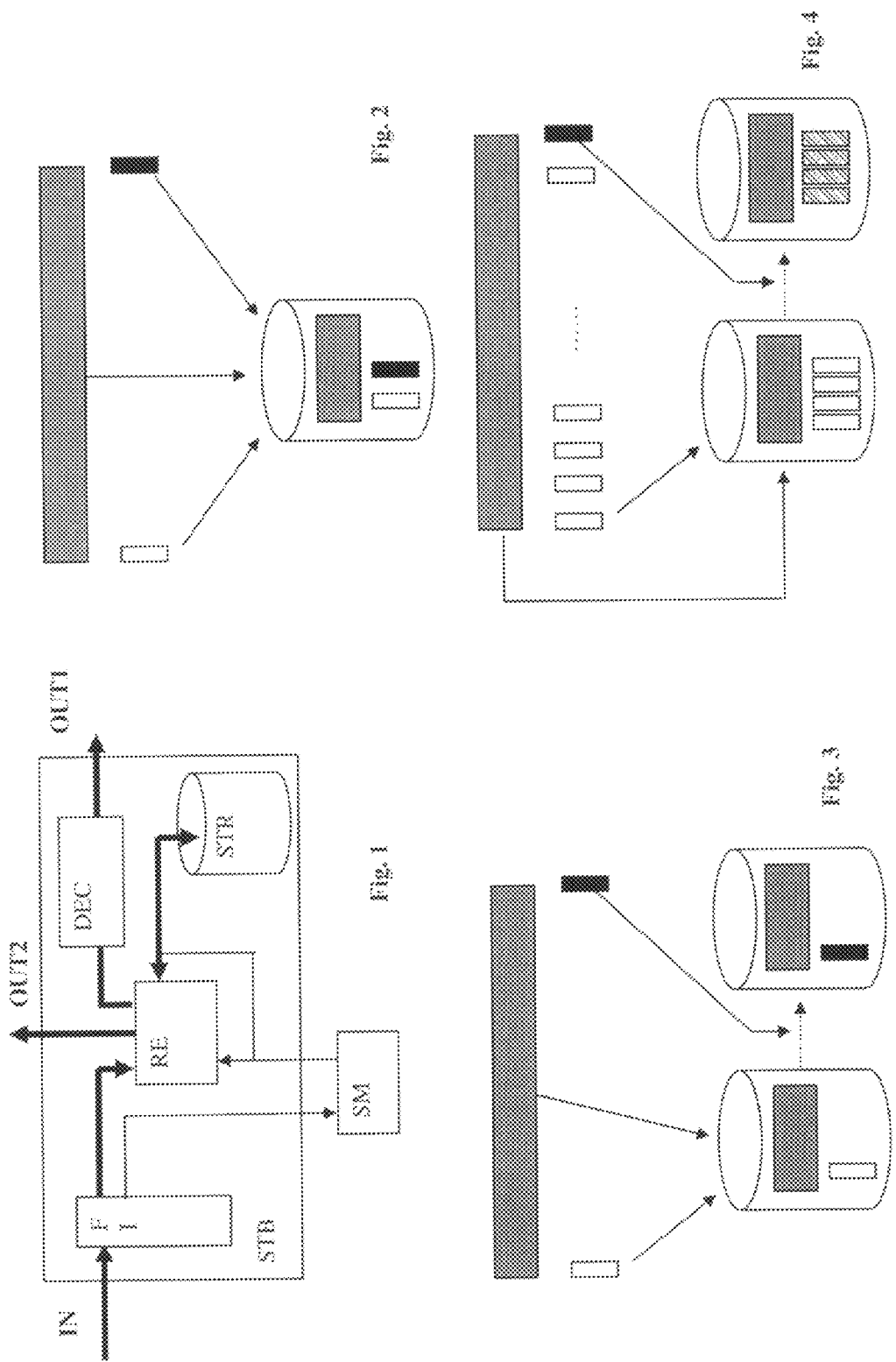

US 9,247,280 B2

STORAGE AND USE METHOD OF A BROADCASTED AUDIO/VIDEO EVENT

PRIORITY STATEMENT

This application claims benefit of priority under 35 U.S.C. §119 from European Patent Application No. 06117739.0 filed on Jul. 24, 2006, in the European Intellectual Property Office, the entire contents of which are herein incorporated by reference.

INTRODUCTION

The present invention relates to the field of the transmission of audio/video content subject to conditional access by means of digital networks, in particular the geographic and temporary management of the consumption rights of content on these networks.

STATE OF THE ART

Allowing a broadcaster to manage the reception of an event according to the geographic location is well known. In fact, broadcasters want to prohibit access to a content such as a sports retransmission in the area surrounding the place where this event takes place. Therefore, through the knowledge of the location of each receiver, a command called <<blackout>> is sent to the receiver, for example with the postal code(s) that may not visualise the event live. The security module of the receiver that holds the location information (for example the post code of the subscriber to the service), on receipt of this message, will thus apply a new rule at the time of the verification of the rights and even if the receiver disposes of the rights for this event, the <<blackout>> message has priority to prohibit access to the event and the control words used to encrypt the event are not returned.

With the development of personal digital networks, additional measures are provided to avoid remote transmission from a receiver located in an area covered by reception rights to a receiver situated in an uncovered area. In particular, this is the aim of certain protection signals of the authorised usage rules (USI—Usage State Information) such as described in the document <<Content Protection and Copy Management>> published by the DVB forum (http://www.dvb.org/technology/dvb-cpcm/a094.DVB-CPCM.pdf). In particular, the usage rules VLOCAL or VLAD (MLOCAL or MLAD respectively) indicate visualisation restrictions (of copies respectively) to a local domestic network.

However, when the users dispose of audio/video content recording means such as those provided by a personal video recorder, prohibiting a posteriori the visualisation of the event is hardly acceptable for the users even if they are situated near the location of the event. This is the reason for which in the usage rules described by DVB CPCM, a rule is provided called <<Remote Access Rule post Record>> which allows access restrictions such as VLOCAL or VLAD to be relaxed remotely after the end of the recording of an event. It should be noted that the duration of the event is rarely known in advance, for example for sports events. Therefore, a command defining the duration sent at the start of diffusion is difficult to apply. Consequently, at the time of the diffusion of non-permanent geographically restricted events, the unsolved problem remains of managing such a recorded content in order to authorise visualisation, once the event has finished, for a user who is inside the restriction area.

In a way well known to those skilled in the art, the security module can essentially be produced according to four different forms. One of these is a microprocessor card, a smart card, or more generally an electronic module (taking the form of a key, a badge, . . . ). This type of module is generally removable and can be connected to the decoder. The form with electric contacts is the most widely used, but a connection without contacts is not excluded, for example of the ISO 14443 type.

A second known form is that of an integrated circuit shell placed, generally in an irremovable and definitive way, in the decoder shell. One variant is made up of a circuit mounted on a base or a connector such as an SIM module connector.

In a third form, the security module is integrated into an integrated circuit shell also having another function, for example in a descrambling module of the decoder or the microprocessor of the decoder.

In a fourth embodiment, the security module does not take a material form, but rather its function is only implemented in the form of software. Given that in the four cases, although the security level differs, the function is identical, it concerns a security module regardless of the way in which it carries out its function or the form that this module may take.

In particular, no distinction is made between a security module responsible for conditional access to the content at the time of its broadcast (case of a conventional restriction <<blackouts>>) and a security module responsible for the protection of the usage rules in a domestic network (case of a CPCM Instance module), which can take any of the aforementioned embodiments.

BRIEF DESCRIPTION OF THE INVENTION

The aim of the present invention is to allow the flexible exploitation of a broadcasted and recorded content, in particular to allow both the users as well as the broadcasters to conciliate temporary prohibition and posterior exploitation.

This aim is reached through a storage method of a broadcasted event, by means of at least one receiver, this method comprising the following steps:

storage of an event encrypted by at least one content key, storage of a control license comprising the content key, an event identifier and first usage conditions, once the broadcasting of the event has finished, generation and storage of a release message, comprising the event identifier and second usage conditions, at the time of the exploitation of the event, search for a release message, and if such a message exists, execution of the second usage conditions of the release message in place of the first usage conditions of the control license.

According to a variant of this method, the aim is also achieved by means of a storage and broadcasting method of an event, by at least one receiver having a security module responsible for the security operations, this method comprising the following steps:

storage of an event encrypted by at least one content key storage of a control license comprising the content key, an event identifier and first usage conditions, once the broadcasting of the event has finished, generation of a release message, containing the event identifier and second usage conditions, extraction of the control license and replacement of the first conditions with the second conditions to create a new control license, storage by the receiver of the new control license then use of the new control license at the time of the exploitation of the event.

In the case in which the event is encrypted by a plurality of content keys, the license for each of these is extracted to replace the first conditions with the second conditions. It is verified that the identification of the event is the same between the control license and the release message.

The generation of the release message can be carried out either locally in the receiver according to preset conditions (conditional at the moment of the change of the event identifier in the stream of ECM on a given service), or by the management centre that manages the diffusion of the event. This centre transmits the release message in the data stream intended for the receiver when the conditions for such a message are fulfilled.

Storage can be carried out either locally in the initial receiver of the event broadcasted, or remotely in another receiver linked to the first receiver by a digital network.

The "end of the diffusion of the event" is understood to mean the moment when the main part of the event has been broadcast, for example during the broadcasting of the end credits, or at any other moment posterior to the broadcasting of this event (1 minute later for example).

BRIEF DESCRIPTION OF THE DRAWINGS

This invention will be better understood thanks to the annexed Figures namely:
FIG. 1 shows a receiver with storage unit
FIG. 2 shows a first embodiment
FIG. 3 shows a second embodiment
FIG. 4 shows a third embodiment

DETAILED DESCRIPTION

The management centre responsible for the broadcasting of an event broadcasts by Hertzian waves, wires, via the Internet or other means an event such as a film, a sports retransmission or any other multimedia content. This event is encrypted by at least one event key Ki. The latter is placed in a control message that will also contain the identification of the event and the usage conditions of the event. These conditions can describe several ways to consume the event, such as for example the possibility or the prohibition of storing the event, the prohibition or the possibility of visualising it immediately, the number of visualisations of the event, the duration time in which the exploitation of the event is authorised, retransmission to the exterior of the receiver etc.

The control messages can take the form of an ECM (Entitlement Control Messages) according to the MPEG-2 standard or a license accompanying the content according to different solutions known in the state of the art.

The receiver STB in FIG. 1 includes an input for the data stream that is forwarded, after a first formatting (demodulation for instance) towards a filter FI. This filter FI allows the separation of a unitary stream comprising sub-streams such as audio data, video data, signalling data and control messages.

The receiver STB in FIG. 1 also includes a processing module RE that allows the audio/video data to be processed, and in particular allows it to be deciphered and possibly re-encrypted if necessary before being transmitted either to the local visualisation unit (decompression module DEC), to the local storage unit (STR), or to an exit towards the external digital network for storage or visualisation in a second receiver.

In order to do this, several modes of operations can be provided:
in a first mode of operation, the audio/video content encrypted by an event key Ki global to all receivers (a key defined at the management centre) is decrypted in the processing module RE and re-encrypted by a local key before being used by the receiver STB. The global key Ki is transmitted either to audio/video data simultaneously, or in advance, in the form of a control message.

The audio/video content can be encrypted by a key Ki unique to all content, or a plurality of keys $Ki_1, Ki_2, \ldots$, each key allowing access to a part of the content. In the latter case, the security module will process the control messages as and when required and will return the necessary control license to the processing module RE at the given time.

in a second operation mode, the encrypted audio/video content is not modified.

The control message(s) is decrypted and re-encrypted by a local key (this can be a key of the local network) in the security module SM which returns the corresponding control license(s) to the processing module. Therefore the content can also be accessed using the second method if the global key is modified.

A synchronisation mechanism between the audio/video data (use of a pointer in the stream to find the current license) allows the present key to be returned at the time of its use. The security module verifies the usage conditions of the content and only sends back the control license(s) if the user disposes of a first processing right. This right does not mean that it is possible to visualise the content, this exploitation right can be acquired later: for example for this case, in the usage rules described by DVB CPCM, a <<Viewable>> rule is provided which allows the explicit indication that the content can no longer be visualised in the control license.

The content can be transmitted in a local network, stored in the storage unit and/or visualised subject to the usage rules specified by the control license attached to this content. A content stored is managed entirely locally, on the basis of the indications contained in the control license.

According to the CPCM standard, there is a difference between the exportation of the data and its local processing.

For example, if the usage rules stipulate that the event cannot be visualised immediately, as for example in a "Blackout" configuration in which the receiver of the event is subject to the visualisation restriction, the event is not decompressed and no signal is transmitted to the exit OUT of the receiver.

In another example, if the usage rules stipulate that the event cannot be transmitted beyond the local network, as for example in a "Blackout" configuration in which the receiver of the event is not subject to the visualisation restriction however other remote receivers are subject to the restriction, the event can be decompressed locally and transmitted to the exit OUT1 of the local receiver, but the digital exit of the receiver OUT2 towards the network is either deactivated, or subject to a connection proximity control (for example with time-out control).

The security module SM thus prepares a local control license on the basis of a global control message (broadcasted) received from the management centre and containing the event encryption key (global key Ki in the first mode of operation, local key in the second mode of operation), as well as the event identifier and the usage conditions in the domestic network. The initial conditions received by the management centre can be modified according to the configuration of the equipment or base rights of the user. This type of solution is described in the document WO01/80563. This control license generated by the security module SM is transmitted to the processing unit RE, either for immediate use (visualisation), or for recording in the storage unit STR, or for transmission by means of the digital network, subject to the usage conditions (usage rules) specified by the control license.

Therefore, in the illustration in FIG. 2, the event is stored in the encrypted form with the control license (blank rectangle)

comprising the first usage conditions. At the end of the diffusion of the event, the management centre transmits a release message containing the second usage conditions (relaxation of the usage rules). This message (black rectangle) is also stored in the storage unit. The second access conditions can constitute the authorisation to visualise the event, for example, as well as its storage, or the authorisation to transmit the event to be visualised remotely as well as locally.

If the user wishes to access this event for visualisation or for remote transmission, the receiver STB will search for the presence of a release message stored in the storage unit STR. This message can have a particular header indicating that it relates to such a message or simply indicating that it concerns the most recent message related to this event. The security module SM decrypts this message and verifies that the event identifier contained in this message is authentic and corresponds correctly to the desired event. If this is the case, these are the usage conditions that will be applied to this content and not those of the initial control license.

According to one embodiment, the event key is only found in the initial control license (white rectangle) and once the second usage conditions have been verified, the processing module can use the event key in the control license.

It is possible for the management centre to insert the event key into the release message. Once the receiver has found the release message, it no longer needs the control license.

However in the case in which the content is locally re-encrypted before storage with the keys generated by the security module, the management centre does not know the corresponding encryption key. In this case it is possible for the security module to insert the event key into a local release message, on one hand locally generated from the control license stored locally and on the other hand generated from the global release message (televised) received from the management centre.

In FIG. 3, the arrival of the release message causes the rewriting of the control license with the second usage conditions contained in the release message. The message finally stored in the storage unit is a concatenation of the information contained in the control license (white rectangle) and of the information contained (essentially the second usage conditions) in the release message. This message can be produced by the security module that carries out this concatenation and generates the new message or, as indicated above, the release message contains all the necessary information (content key amongst others) rendering the presence of the control license unnecessary.

The case is slightly more complicated when the event is encrypted by a plurality of keys as shown in FIG. 4, as is the case for example in conventional television broadcast systems. A control license, called ECM in the MPEG-2 ISO13818-1 standard, containing the current key is sent every time the key encrypting the event changes.

In the case in which the content is stored as it is broadcasted without being re-enciphered locally, these multiple control licenses are stored in the storage unit STR with the event as they are received.

In the case in which the content is re-enciphered locally, it is possible for the security module to generate a different content key and a local control license containing the latter for each control license received, as described in the application WO9916244. These control licenses are stored in the storage unit STR with the event as the latter is received and re-enciphered.

Therefore, in each of these licenses stored in the storage unit STR, the first usage conditions are included.

According to a first embodiment, at the time of the generation of the release message, the latter causes the updating of all the messages transmitted previously, illustrated by the grey rectangles. The control licenses containing the current key will henceforth contain the second usage conditions.

According to a second embodiment, the release message is stored in the storage unit STR in addition to the control licenses. The receiver, before processing an event from the storage unit STR, will verify if such a release message related to this event exists on the latter, and if so, will take into account the second access conditions in place of the conditions contained in the intermediate control licenses.

According to another embodiment of the invention, the release message is not transmitted by the management centre but rather is generated locally, in particular by the security module. The first control license message will contain the explicit first and second usage conditions. These second conditions will be used either to generate and store the release message, or to update the control license(s) received at the time of the diffusion of the event.

According to a first variant, duration information is communicated in the message of the control license to indicate at which moment the security module can generate the release message. Once the predefined time has come to an end, the security module generates the release message with the consequences described in the different embodiments explained above.

According to a second variant, the detection of the end of an event is carried out thanks to the event identifier. Each control license includes the current event key and the event identifier. As soon as the security module receives a control license message including another event identifier, it triggers the generation of the release message. In order to prevent the user from using this procedure to generate such a message inopportunely when changing channel for example, the security module can prohibit all generation or storage of a new control license message from the moment in which it has generated the release message. As a consequence of this the user will be able to see the start of the event immediately, but the part of the event recorded in the storage unit from the generation of the release message until the end of the event will be inaccessible since the control licenses will no longer be stored.

According to a local generation mode of the release message, changing the broadcasting channel does not immediately trigger such a message. A minimum time is required (for example longer than the advertisement break) on another channel for the event end condition to be fulfilled. If it returns to the event for which a release message is pending, this time will be set to zero. At the end of the event, the release message will be generated after the expiration of the minimum time, regardless of the channel that the user is watching.

Also by way of additional security, according to the implementation of the information storage mechanisms, the security module can request the elimination of the release message or its regeneration with the more restrictive first usage conditions if said module receives a control license that has the same event identifier after the generation of the release message, since it indicates that the broadcasting of the event has not finished.

It is also possible to combine the timetable mode and the automatic mode. In fact, the security module is informed that the event will last at least 105 minutes for a football match. From this moment, the security module will monitor a change of channel (or network) and trigger the release message from the appearance of a control license message related to another event.

In the first embodiment described previously, the processing module RE also includes an encryption module of said event thanks to a re-encryption key. This key can be a key pertaining to the decryption/re-encryption module RE or can be provided by the security module SM. In this case, this key can be a personal key of the security module: that is to say common to all the re-encryptions carried out by the decryption/re-encryption module RE, or this key can be generated randomly by the security module SM for this event. The re-encrypted audio/video data stream is stored in the storage unit STR or transmitted to another receiver by means of the digital network.

The invention claimed is:

1. A storage and exploitation method by at least one receiver of a broadcasted event, the method comprising:
   receiving an event encrypted by an event key,
   receiving at least one control message including access conditions and the event key,
   storing at least one of:
      the event encrypted by the event key, the event key being a content key, and
      the event re-encrypted by the content key after decryption of the event by the event key,
   generating a control license having the content key and first access conditions based on the access conditions of the at least one control message,
   storing the control license, and
   detecting automatically an end of diffusion of the event by a change in an event identifier, and generating a release message having second access conditions to renew the control license either locally in the receiver according to preset conditions or remotely by a management centre that manages the end of diffusion of the event,
   the first and second access conditions being selected among at least one of:
      authorizing or forbidding an immediate display of the event,
      authorizing or forbidding a storage of the event,
      authorizing or forbidding a transmission of the event on a local network, and
      authorizing or forbidding a transmission of the event on a wide area network.

2. The method according to claim 1, wherein the event key is contained in a message encrypted by a transport key, the method further comprising:
   decrypting the message encrypted by the transport key,
   extracting the event key
   re-encrypting the event key by a local key, and
   storing the event key re-encrypted by the local key with the control license.

3. A method according to claim 2, wherein conditions of an end of a main event are fulfilled during the reception of a secondary event for a minimum preset duration, each returning to the main event to reset a counter.

4. The method according to claim 1, wherein said at least one receiver being connected to a security module responsible for the processing of the control license, and
   wherein the generation of the release message is carried out by the security module of the at least one receiver as soon as the end of the event are detected.

5. The method according to claim 4, wherein the conditions of the end of the main event are fulfilled when a preset duration of the event is reached and when a user changes channel.

6. The method according to claim 1, wherein the first access conditions define a prohibition of the visualization of the event broadcasted and the second access conditions define an authorization for the visualization of the event broadcasted.

7. The method according to claim 1, wherein the first access conditions define a prohibition of the exportation of the event broadcasted on a network and the second access conditions define an authorization for the exportation of the event broadcasted on said network.

8. The method according to claim 1, further comprising:
   after the detection of the end of the event, extracting from the control license the first access conditions and replacing the first access conditions by the second access conditions.

9. The method according to claim 1, further comprising:
   storing the release message after the detection of the end of the event.

10. A storage and exploitation method by at least one receiver of a broadcasted event having a security module responsible for security operations, the method comprising:
    storing an event encrypted by at least one content key,
    storing a control license having the at least one content key, an event identifier and first access conditions,
    automatically, at the time of an end of diffusion of the event, generating a release message, containing the event identifier and second access conditions, extracting the control license, and replacing the first access conditions with the second access conditions to create and renew a new control license either locally in the receiver according to preset conditions or remotely by a management centre that manages the end of diffusion of the event, and
    storing the at least one receiver of the new control license, and using the new control license during the exploitation of the event.

* * * * *